United States Patent [19]
Moslehi et al.

[11] Patent Number: 6,011,881
[45] Date of Patent: Jan. 4, 2000

[54] FIBER-OPTIC TUNABLE FILTER

[75] Inventors: Behzad Moslehi, Mountain View; Richard James Black, Palo Alto; Herbert John Shaw, Stanford, all of Calif.

[73] Assignee: Ifos, Intelligent Fiber Optic Systems, Mt. View, Calif.

[21] Appl. No.: 08/999,101

[22] Filed: Dec. 29, 1997

[51] Int. Cl.[7] .............................. G02F 1/295; G02B 6/34
[52] U.S. Cl. ................................................ 385/10; 385/37
[58] Field of Search ................................ 385/10, 37, 30

[56] References Cited

U.S. PATENT DOCUMENTS

| | | | |
|---|---|---|---|
| 4,268,116 | 5/1981 | Schmadel et al. | 350/96.29 |
| 4,622,663 | 11/1986 | Ishikawa et al. | 370/3 |
| 4,787,694 | 11/1988 | Brambley et al. | 350/96.19 |
| 4,867,522 | 9/1989 | Cassidy | 385/1 |
| 4,881,791 | 11/1989 | Mallison et al. | 350/96.19 |
| 4,986,623 | 1/1991 | Sorin | 350/96.15 |
| 4,986,624 | 1/1991 | Sorin et al. | 350/96.19 |
| 5,007,705 | 4/1991 | Morey et al. | 385/12 |
| 5,048,913 | 9/1991 | Glenn et al. | 385/37 |
| 5,237,576 | 8/1993 | DiGiovanni et al. | 372/6 |
| 5,416,866 | 5/1995 | Sahlen | 385/37 |
| 5,550,940 | 8/1996 | Vengsarkar et al. | 385/28 |
| 5,719,971 | 2/1998 | Smith | 385/17 |
| 5,781,677 | 7/1998 | Jin et al. | 385/37 |
| 5,809,188 | 9/1998 | Tseng et al. | 385/37 |

OTHER PUBLICATIONS

Bergh, Kotler, Shaw: "Single–Mode Fibre Optic Directional Coupler" Electronics Letters, 16 (7) Mar. 27 (1980).

Leminger, Zengerle: "Determination of Single–Mode Fiber Coupler Design Parameters from Loss Measurement", IEEE Journal of Lightwave Technology, LT–3(4):864–7 Aug. (1985).

Sorin, Kim, Shaw: "Highly Selective Evanescent Modal Filter for Two–Mode Optical Fibers", Optics Letters 11(9) 581–583 Sep. (1986).

Hill et al: "Optical Fiber Directional Couplers: Biconical Taper Technology and Device Applications", Proceedings SPIE 574: 92–99 (1985) No month available.

Bures, Lapierre, Lacroix: "Analyse D'un Coupler Bidrectional A Fibres Optiques Monomodes Fusionnees", Applied Optics 22: 1918–1921 Jun. 15 (1983) no English translation.

Sheen and Guallorenzi: "Single–Mode Fiber–Optical Power Diviner: Encapsulated Etching Techniques", Optics Letters 4(1): 29–31 Sep. 8 (1979).

Ribeiro et al: "Analysis of the Reflective–Matched Fiber Bragg Grating Sensing Interrogation Scheme", Applied Optics 36(4):934–939 Feb. 1 (1997).

Sorin & Shaw: "A Single Mode Fiber Evanescent Grating Reflector", Journal of Lightwave Technology LT–3:1041–1045 Oct. (1985).

Hill et al: "Photosensitivity in Optical Fiber Waveguides: Application to Reflected Filter Fabrication", Applied Physics Letters 32(10): 647–649 May 15 (1978).

Meltz et al: "Formation of Bragg Gratings in Optical Fibers by a Transverse Holographic Method", Optics Letters 14:823–825 Feb. 6 (1989).

Hill et al: "Efficient Mode Conversion in Telecommunications Fibre Using Externally Written Gratings", Electronics Letters 26:1270–1272 Aug. 2 (1990).

Diemeer et al: Low–Loss (Non)Linear Optical Polymetric Waveguide Materials and Devices, SPIE 2527 Organic Materials VIII, Jul. 1995.

*Primary Examiner*—John D. Lee
*Assistant Examiner*—Juliana K. Kang
*Attorney, Agent, or Firm*—Jay A. Chesavage

[57] ABSTRACT

A tunable filter comprises either an internal or an external grating proximal to a variable index of refraction material. This variable index of refraction material may vary upon the application of an external electrical potential or the application of a change in temperature of the polymer. Additionally, the grating may comprise a periodic modulation of the index of refraction, this periodic modulation comprising an isoplanar modulation of the index of refraction at an angle to the central axis of the waveguide, thereby causing conversion of fundamental mode waves to second mode waves, and by reciprocity, conversion of second mode waves to fundamental mode waves.

20 Claims, 5 Drawing Sheets

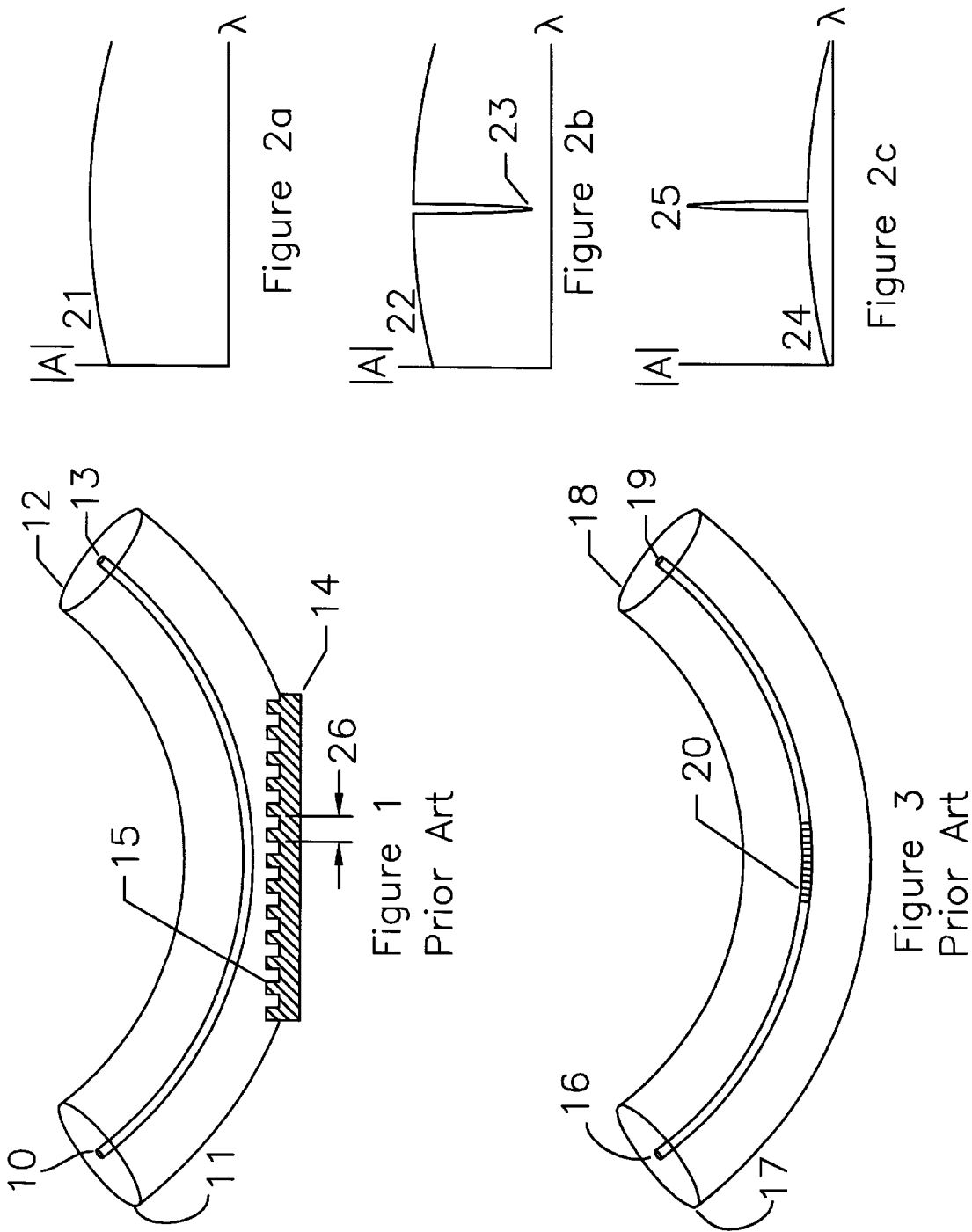

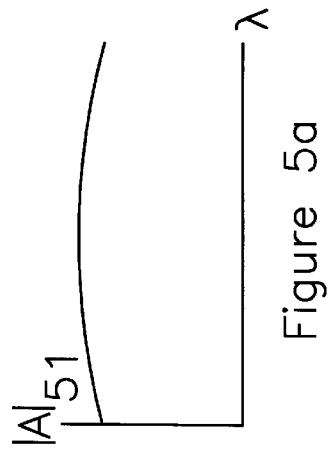
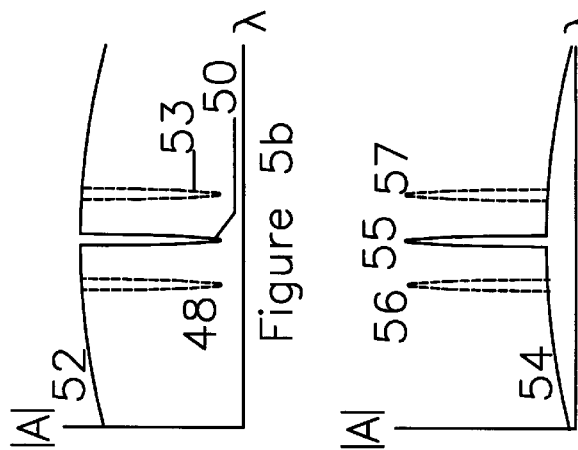
Figure 5a
Figure 5b
Figure 5c
Figure 4a
Figure 4b

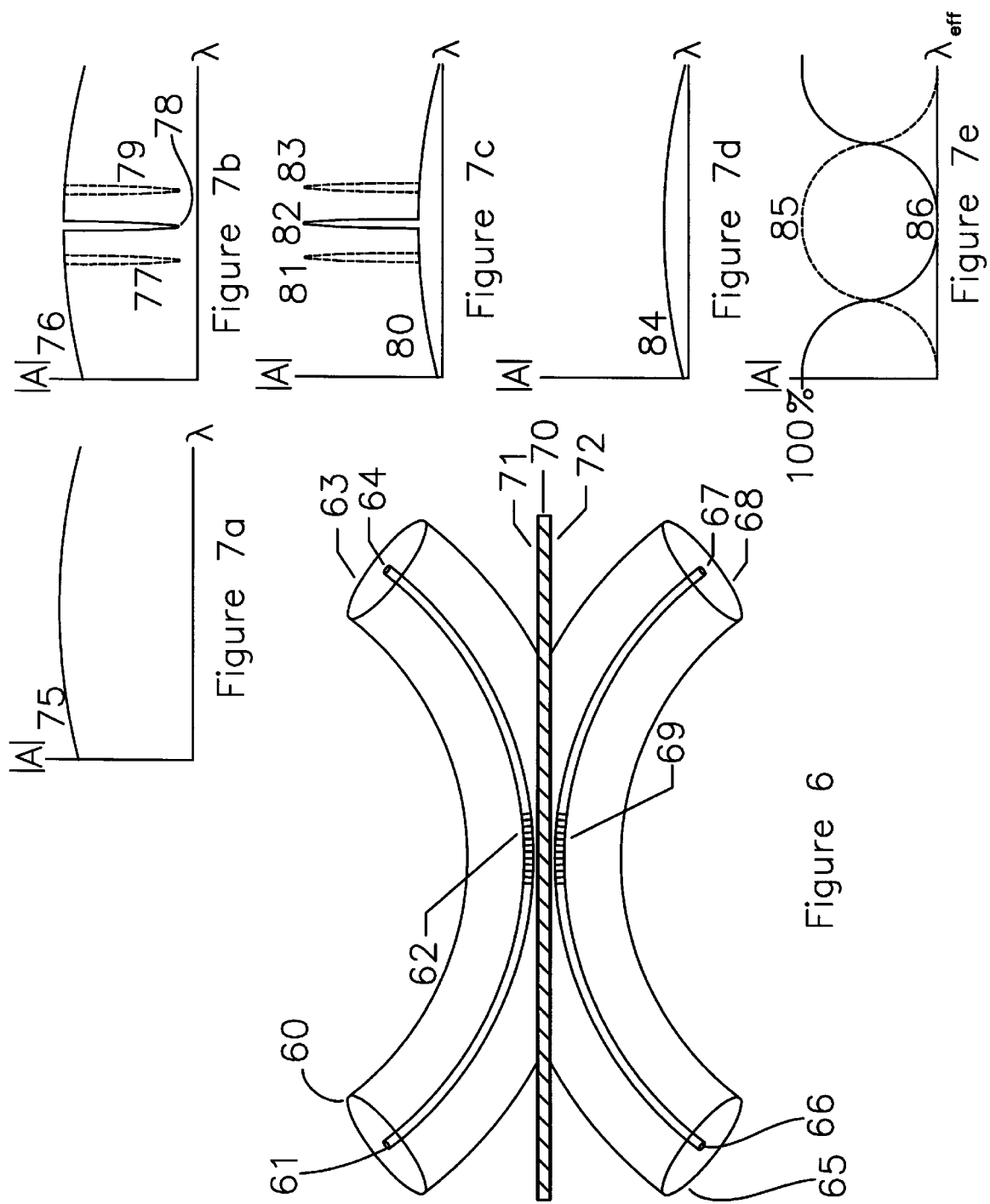

FIBER-OPTIC TUNABLE FILTER

FIELD OF THE INVENTION

This invention was made with U.S. Government support under DARPA grant #DAAH01-96-C-R295. The current invention applies to the field of optical waveguides, particularly fiber-optic, filtering devices wherein the wavelength of filtering is continuously tunable through the variation of external control parameters.

BACKGROUND OF THE INVENTION

There are several modern methods of fabricating optical waveguides for the low-loss containment and delivery of optical waves. One such waveguide is optical fiber which typically comprises an inner glass core surrounded by a glass cladding and a protective plastic jacket. Guidance of electromagnetic waves is achieved by the core having a slightly higher index of refraction than the surrounding cladding. Typical values for the core diameter are of order 10 $\mu$m for single-mode fiber operating at communications wavelengths of 1300–1550 nm, and 50 $\mu$m or 62.5 $\mu$m for highly multi-mode fiber. Whether single-mode or multi-mode, the cladding diameter has most commonly an overall diameter of 125 $\mu$m, and a plastic jacket diameter is typically 250 $\mu$m for standard telecommunications fiber. The glass core is generally doped with germanium to achieve a slightly higher index of refraction than the surrounding cladding by a factor of roughly 1.001. The jacket is generally plastic and is used to protect the core and cladding elements. It also presents an optically discontinuous interface to the cladding thereby preventing coupling modes in the cladding to other adjacent fibers, and usually plays no significant part in the optical behavior of the individual fiber other than the usually rapid attenuation of cladding modes in comparison with bound core modes.

As described in the book by Snyder and Love entitled "Optical Waveguide Theory" published by Chapman and Hall (London, 1983), under the assumptions of longitudinal invariance and small index differences for which the scalar wave equation is applicable, the modal field magnitudes may be written $$\Psi(r,\phi,z)=\psi(r,\phi)\exp\{i(\beta z-\omega t)\}$$

where
- $\beta$ is the propagation constant
- $\omega$ is the angular frequency
- $t$ is time
- $z$ is the axial distance
- $r,\phi$ is the polar trans-axial position along the fiber.

Single-mode fibers support just one order of bound mode known as the fundamental-mode which we denote as $\psi_{01}$, and which is often referred to in the literature as $LP_{01}$. The transverse field dependence for the fundamental-mode in the vicinity of the core may be approximated by a gaussian function as $$\psi_{01}(r,\phi)=\exp\{-(r/r_{01})^2\}$$

where
- $r_{01}$ is the fundamental-mode spot size.

Two-mode fibers support two orders of mode. In addition to the fundamental-mode, two-mode fibers support a second order of bound mode which we denote as $\psi_{11}$, and which is often referred to in the literature as $LP_{11}$. The transverse field dependence of the second order modes in the vicinity of the core may be approximated as $$\psi_{11}(r,\phi)=r\exp\{-(r/r_{11})^2\}f_1(\phi)$$

where
- $r_{11}$ is the second-mode spot size
- $f_1(\phi)$ is the rotation of the pattern described by
- $f_1(\phi)=\cos(\phi)$ or $\sin(\phi)$, and the other variables and constants are as described above. The optical fields of second modes spread out further into the cladding, and require fibers with a larger optical fiber core diameter and/or core-cladding index of refraction difference to reduce attenuative effects, compared to fundamental-mode waves, which have less spread in their field patterns, and hence can propagate in optical fibers with smaller core diameters and/or core-cladding index of refraction differences.

While the above equations describe fundamental and second-mode waves in their most common mathematical forms, it is clear to one skilled in the art that other two-mode wave systems are available for separation and aggregation on the basis of modal characteristic, among which (a) the first two Transverse Electric (or Transverse Magnetic) modes of planar waveguides commonly known as $TE_0$ and $TE_1$ (or $TM_0$ and $TM_1$), (b) two polarizations of a given order of mode such as (i) planar waveguide modes $TE_0$ and $TM_0$, and the polarized optical fiber modes known as $LP_{01}^x$ and $LP_{01}^y$, as well as (c) the higher level modes of the waves described here and in the publications and patents cited herein, all of which are incorporated by reference.

Optical fiber couplers are well known in the art, and generally comprise two fibers as described above having their jackets removed and bonded together with claddings reduced so as to place the fiber cores in close axial proximity such that energy from the core of one fiber couples into the core of the adjacent fiber. There are currently two main ways of practicing this coupling, as well as a third less-used technique. The first method is the side-polished coupler, wherein the cladding material from each fiber is removed through a mechanical polishing operation, followed by a bonding of the two polished claddings together to allow evanescent coupling between the fiber cores. Generally, these couplers are fabricated from a pair of single-mode, or a pair of multi-mode fibers. The side-polished class of fiber optic coupler is described in publications "Single-mode Fibre Optic Directional Coupler" by Bergh, Kotler, and Shaw in Electronics Letters, 16(7)(1980), and "Determination of Single-mode Fiber Coupler Design Parameters from Loss Measurement" by Leminger and Zengerle in the IEEE Journal of Lightwave Technology, LT-3:864–867 (1985). A new class of side-polished mode-converting couplers is described in "Highly selective evanescent modal filter for two-mode optical fibers" by Sorin, Kim and Shaw in Optics Letters 11:581–583 (1986). This class of coupler is fabricated by polishing and bonding a single-mode fiber with a two-mode fiber. As will be described later, this mode-converting coupler converts fundamental-mode waves in a single-mode fiber into second-mode waves, which are principally coupled into the two-mode fiber. A second method of fabricating optical couplers is a fused tapered coupler wherein the two fibers are placed in close proximity, heated, and drawn together. The fused tapered class of coupler is described by Hill et al in "Optical fiber directional couplers: biconical taper technology and device applications", Proceedings SPIE 574:92–99 (1985) with analysis of their operation given in Bures, Lapierre, Lacroix "Analyse d'un coupleur bidirectionnel a fibres optiques monomodes fusionnees" in Applied Optics 22:1918–1921 (1983).

The third method of making couplers involves etching the cladding as described in "Single-mode power divider:

encapsulated etching techniques" by Sheen and Giallorenzi in Optics Letters 4(1):29–31 (1979). Because of reciprocity, optical couplers fabricated from single-mode fiber are intrinsically power-splitting reciprocal devices. The most commonly used coupler involves two coupled single-mode fibers and thus is intrinsically a 4 port device. If such a coupler is used to extract the wavelength band reflected by a single-mode grating, then, because of splitting-loss for the two traversals of non-mode-converting coupler (before and after reflection by the grating), a maximum peak power that can be extracted is 25% of the peak power that would be reflected without the coupler in the system. This least loss case involving approximately 6 dB loss is for a 50/50 splitter known as a 3 dB coupler. Cascaded couplers of this type are frequently used in single-mode systems, and the losses can become quite high, and increase for each optical coupling event, as computed for one such system in the publication "Analysis of the reflective-matched fiber Bragg grating sensing interrogation scheme,, by Ribeiro et al in Applied Optics 36:934–939 (1997).

Fiber optic filters are well known in the art, and may be constructed using a combination of optical fiber and gratings. Using fiber of the previously described type, there are several techniques for creating fiber optic gratings. The earliest type of fiber grating-based filters involved gratings external to the fiber core, which were placed in the vicinity of the cladding as described in the publication "A single mode fiber evanescent grating reflector" by Sorin and Shaw in the Journal of Lightwave Technology LT-3:1041–1045 (1985), and in the U.S. patents by Sorin et al U.S. Pat. No. 4,986,624, Schmadel et al U.S. Pat. No. 4,268,116, and Ishikawa et al U.S. Pat. No. 4,622,663. All of these disclose periodic gratings which operate in the evanescent cladding area proximal to the core of the fiber, yet maintain a separation from the core. A second class of filters involve internal gratings fabricated within the optical fiber itself. One technique involves the creation of an in-fiber grating through the introduction of modulations of core refractive index, wherein these modulations are placed along periodic spatial intervals for the duration of the filter. In-core fiber gratings were discovered by Hill et al and published as "Photosensitivity in optical fiber waveguides: Application to reflected filter fabrication" in Applied Physics Letters 32:647–649 (1978). These gratings were written internally by interfering two counter propagating electromagnetic waves within the fiber core, one of which was produced from reflection of the first from the fiber end face. However, in-core gratings remained a curiosity until the work of Meltz et al in the late 1980s, who showed how to write them externally by the split-interferometer method involving side-illumination of the fiber core by two interfering beams produced by a laser as described in the publication "Formation of Bragg gratings in optical fibers by a transverse holographic method" in optics Letters 14:823–825 (1989). U.S. patents Digiovanni U.S. Pat. No. 5,237,576 and Glenn U.S. Pat. No. 5,048,913, also disclose Bragg gratings, a class of grating for which the grating structure comprises a periodic modulation of the index of refraction over the extent of the grating. Within this class of in-fiber gratings, most of the art is directed to in-fiber gratings having the Bragg plane of refractive index modulation perpendicular to the principal axis of the core of the fiber optic cable. This mapping of constant refractive index in the fiber is referred to as isoplanar modulation of the index of refraction, referring to the plane of constant lines of index of refraction, and the angle between this isoplanar modulation and the optical fiber core is referred to as the grating angle. A new class of grating involves in-fiber gratings with an angular offset in the plane of refractive index modulation. This type of angled grating is referred to as a mode-converting two-mode grating, and, with properly chosen angle, has the property of converting fundamental-mode power into second-mode power and visa versa. Whether internal or external, both types of gratings can be fabricated as short-period gratings, or long-period gratings. Short-period gratings reflect the filtered wavelength into a counter-propagating mode, and, for silica based optical fibers, have refractive index modulations with periodicity on the order of a third of the wavelength being filtered. Long-period gratings have this modulation period much longer than the filtered wavelength, and convert the energy of one mode into another mode propagating in the same direction, i.e., a co-propagating mode, as described in the publication "Efficient mode conversion in telecommunication fibre using externally written gratings" by Hill et al in Electronics Letters 26:1270–1272 (1990). The grating comprises a periodic variation in the index of refraction in the principal axis of the core of the fiber, such variation comprising a modulation on the order of 0.1% of the refractive index of the core, and having a period associated with either short or long-period gratings, as will be described later.

Another type of filter is the tunable filter. This class of filter is generally variable according to control by an external parameter. One type of tunable filter is shown by Brambley et all in U.S. Pat. No. 4,787,694 which discloses a side-polished fiber with a grating pattern applied by a disk having a regular grating pattern adjacent to the fiber core. The pitch of the grating is changed by rotating the disk to achieve a lower grating pitch which varies as the cosine of the angle of rotation. Sorin U.S. Pat. No. 4,986,623 shows a similar arrangement of a side polished fiber in contact with a radially symmetric grating plate, such that a linear translation of the grating plate causes the pitch of the grating to be modified, thereby causing the Bragg wavelength to change.

SUMMARY OF THE INVENTION

The present invention is directed to a tunable optical filter. A grating is combined with a side polished fiber wherein the grating is also in the vicinity of a material having a variable index of refraction. A first object of the invention is a tunable optical filter. A second object of the invention is a tunable optical coupler. A third object of the invention is a tunable filter or coupler with high speed tunability using external control means.

BRIEF DESCRIPTION OF THE DRAWINGS

FIG. 1 is a prior art non-tunable external grating filter.

FIG. 2a, 2b, and 2c are the transfer functions for the prior art filter of FIG. 1.

FIG. 3 is a prior art non-tunable internal grating filter.

FIG. 4a is a tunable 2-port filter.

FIG. 4b is a detail view of the angled grating.

FIG. 5a, 5b, and 5c are the transfer functions for the tunable filter.

FIG. 6 is a tunable 4-port filter.

FIG. 7a, 7b, 7c, 7d, and 7e are the transfer functions for the tunable 4-port filter.

DETAILED DESCRIPTION OF THE INVENTION

Figure 8:
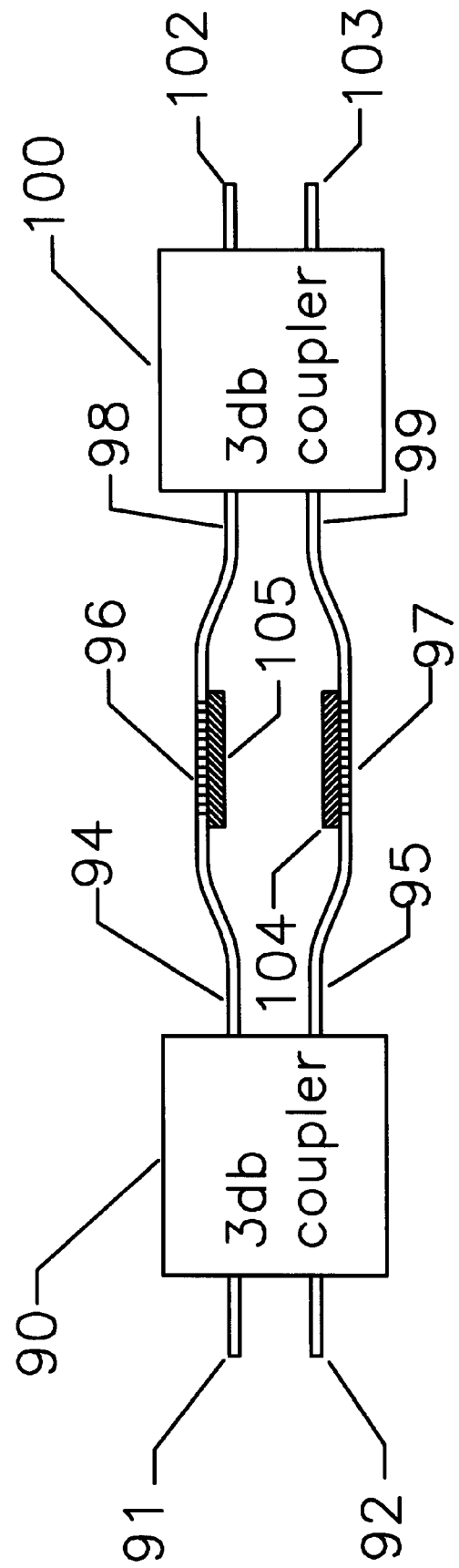
FIG. 8 is a function-equivalent diagram of the tunable 4-port filter.
Figure 9:
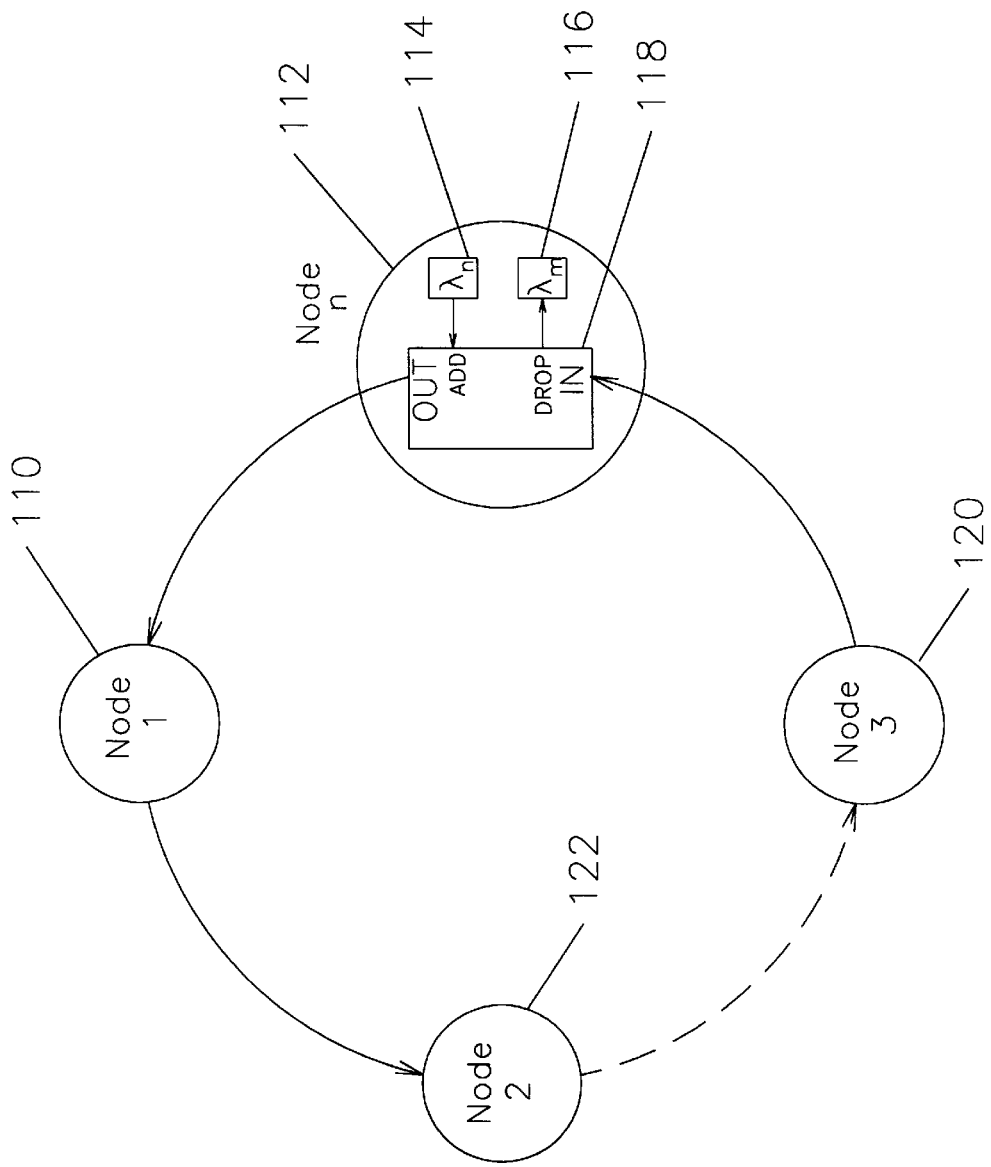
FIG. 9 is a block diagram of a ring network.

FIG. 1 shows a prior art external grating filter. An optical fiber having a core 10 and cladding 11 is placed in a fixture and first side polished in region 14, and then a series of grooves 15 are cut or etched into the fiber cladding. These grooves 15 have a regular pitch 26, and are used to create either long-period or short-period grating behavior. For transmission of waves through the grating at wavelength $\lambda_b$, the long-period grating function is as follows:

$$\Lambda_b = \lambda_b/(n_1 - n_2)$$

where $\Lambda_b$=pitch of the desired Bragg grating, $\lambda_b$=conversion wavelength:

For long period gratings, this is the wavelength for which conversion occurs between the first and second mode waves which are co-propagating (traveling in the same direction). For short period gratings as described below, $\lambda_b$ is the wavelength for which incident fundamental mode wave energy is converted to counter-propagating (traveling in the opposite direction) second mode wave energy, and by symmetry, incident second mode wave energy is converted to counter-propagating fundamental mode wave energy.

$n_1$=effective index of refraction of the first mode, $n_2$=effective index of refraction of the second-mode.

In the case of a reflected wave returning to the entry port, a sign reversal occurs for $n_2$, wherein the formula becomes for the short-period grating:

$$\Lambda_b = \lambda_b/(n_1 + n_2)$$

Examining now the transfer curves for a short-period grating 15, FIG. 2a–c shows the input source spectrum 21 applied to port 10, and the output spectrum 22 observed at port 13. Filter notch 23 represents wave energy reflected by the short period grating back to the input port 10, and is represented as spectrum 24 having peak 25 corresponding to the Bragg wavelength, which is the same as that of notch 23. The use of reflected wave energy at peak 25 is generally not available without the use of an optical coupler or some other device sensitive to the propagating direction of this wave.

For the case of a long-period grating 15, an input spectrum 21 applied to input port 10 converts fundamental-mode wave energy into second-mode wave energy at the Bragg wavelength 23, while out-of-band wave energy propagates through the fiber without such mode conversion. The modal conversion by waves at the Bragg wavelength 23 is bilateral, and also changes incoming second-mode wave energy applied to input port 10 into fundamental-mode wave energy observed at output port 13.

It can then be seen that short-period gratings can be used to create a transmission notch or bandstop filter, while long period gratings can be used to create a transmission bandpass filter, if the modes can be separated by the addition of a coupler. Common to all types of these prior art filters is the inability to tune the wavelength characteristics of the filter over a range, as the period of the grating is mechanically determined, and the external grating structures 15 or internal grating structures 20 are generally delicate. The introduction of a mechanical stress through a piezo-electric transducer or a magnetostrictive material will incrementally lengthen or shorten the grating, resulting in small shifts in the tuning frequency.

An in-core grating filter is shown in FIG. 3, and has similar characteristics to the external grating filter of FIG. 1. For wave energy incident on input core 16, output filtering patterns as described earlier are created at output core 19. In-fiber grating 20 may be short-period or long-period, and will produce the same filtering functions as described in FIGS. 1 and FIG. 2a–c.

FIG. 4a shows the in-fiber grating filter having a side polished and placed in contact with variable index of refraction material 44. This material has the property of continuously variable index of refraction. One such class of materials is known as Electro-Optic Polymers, or EOPs. EOPs have the property of variable index of refraction based on applied electric field. Accordingly, electrode elements 46 and 47 are shown to allow such control. When EOP 44 is presented with an electric field gradient applied via electrodes 46 and 47, a change in the index of refraction takes place in EOP 44, thereby altering the propagation velocity of light in EOP 44, which has the same effect as changing the pitch of grating 45, thereby changing the Bragg wavelength of filtering. Electro Optic Polymers have the advantage of very fast response time, although the range of index of refraction change tends to be small. Commercially available examples of EOP are PL-1021 and PL-2122 available from Flamel Corporation, or POLY(DR1-MMA) available from IBM. It is clear to one skilled in the art that while these particular materials demonstrate clear index of refraction modulation, many other materials are available with electro-optical properties which would perform satisfactorily in changing the index of refraction in the structure. Another class of variable index of refraction materials that could be used for element 44 is thermo-optic polymers (TOP), which generally have a greater change in index of refraction compared to EOPs, although the response time is slower compared to TOPs due to the thermal delay associated with modulating the temperature of active area of TOP. TOPs are described in the paper "Low-loss (non)linear optical polymeric waveguide materials and devices" by Diemeer et al in SPIE 2527 Organic Materials VIII, July 1995. FIG. 4b shows a series of isoplanar modulations 58 in the index of refraction which taken together form Bragg grating 45. Reference plane 59, which is perpendicular to the fiber core 43 becomes the reference for measurement of isoplanar angle 49, which varies between 2 and 10 degrees for mode converting grating 45. In the non-mode converting case, grating angle 49 is 0 degrees, as it typical for prior art gratings. The grating pitch 73 is the Bragg grating period as earlier described, and is usually chosen to have either short-period or long-period value. The radial extent of grating isoplane 49 is typically both the core and cladding of the fiber, however, as is clear to one skilled in the art, an angled periodic modulation in the fiber which includes any combination of core and cladding would create the Bragg grating used in this disclosure. Examining further the nature of gratings 58, lines of constant index of refraction 58a and 58b are shown. While the nature of the periodic modulation is shown as sinusoidal, it is clear to one skilled in the art that the modulation could be any periodic function, for example a triangle modulation, or a step-function modulation. For the case of a sinusoidal modulation as in this example, constant-index lines 58a and 58b form the locus of iso-index of refraction points in a particular axial plane. The axial offset in 58a and 58b is due to the angle 49 of the grating. The locus of points in the transaxial plane at angle 49 to the central axis 74 is shown by the lines of constant index 58c and 58d. Each of the locus lines 58a, 58b, 58c, and 58d have identical values of index of refraction. The family of such lines of constant index of refraction having circular symmetry about angle 49 forms the angled grating 45. Isoplanar modulation of the index of refraction particularly describes the planar nature of the constant index grating 58 wherein the isoplanes 58 are formed by lines of constant index of refraction, and the isoplanes 58 are independent of the particular form of modulation function shown by 58a and 58b.

The effect of varying the index of refraction in interface material 44 is to create an effective change in the pitch of in-fiber grating 45. FIG. 5a, 5b, and 5c show this effect. Input port 40 is excited with a source having a spectrum 51. Nominally, output port 43 produces spectrum 52 with Bragg wavelength notch 50 for a short-period grating 45. As material 44 index of refraction decreases, the effective period of grating 45 decreases, and notch wavelength 50 moves to notch wavelength 48, and conversely, when material 44 index of refraction increases, the effective period of the grating 45 increases, and notch wavelength 50 moves to notch wavelength 53. Analogously, reflected wave energy of curve 54 peaks at Bragg wavelength 55 for nominal index of refraction, and follows notch wavelength 50 to lower wavelength 56 or higher wavelength 57, tracking the notch at 50, 48, and 53 respectively. As described earlier for long-period gratings, the respective bandpass and notch filtering functions change for transmitted versus reflected wave energy compared to short-period gratings.

FIG. 6 shows a tunable optical coupler. A first side polished fiber having an input port comprising core 61 and cladding 60, and an output port comprising core 64 and cladding 63 is placed in contact with variable index of refraction material 70 having contacts 71 and 72 for application of a variable control voltage. Although electrodes 71 and 72 are shown adjacent to variable index of refraction material 70, this material could be fabricated to respond to different control parameters, including voltage, current, temperature, and many other externally variable parameters. The electrodes shown for control of variable index of refraction material 70 are for illustrative purposes only, and are not intended to exclude other suitable materials having the property of variable index of refraction. A second side polished fiber having an input port comprising core 66 and cladding 65 and an output port comprising core 67 and cladding 68 is placed in contact with the opposing side of variable index of refraction material 70. Each fiber is side-polished adjacent to in-core gratings 62 and 69, which are chosen to be symmetrical in extent, pitch, and proximity to variable index of refraction material 70. A special case occurs in FIG. 6 where neither gratings 62 nor 69 are present. In this case, the power transfer from input port 61 to first output port 64 and second output port 67 varies with wavelength as shown in FIG. 7e. This would be typical behavior for a fused optical coupler. In the new coupler, variable index of refraction material 70 provides a tunability of optical transfer function for a particular wavelength. In FIG. 7e, curve 85 represents power delivered to the first output port 64 and curve 86 represents power delivered to second output port 67 versus wavelength. For an ideal lossless coupler, curves 85 and 86 add up to 100% of the power present in the input port 61. As can be seen, modifying either the incident wavelength or the apparent wavelength through the variable index of refraction for material 70 causes the power delivered to first output port 64 and second output port 67 to change according to the control voltage applied to terminals 71 and 72. Accordingly, it would also be possible to substitute a thermal-electric polymer, or any other material having a variable and controllable index of refraction for variable index of refraction material 70 for this or any other topology using variable index of refraction material 70.

FIG. 7a shows the transfer function for this filter. Input spectrum 75 is applied to input port 61. For the short-period case where in-fiber gratings 62 and 69 are matched as previously described, light waves at the Bragg wavelength are reflected by the gratings and are directed to drop port 66, as shown by curve 80 at Bragg wavelength 82. Waves not at the Bragg wavelength are coupled to output port 67, as shown by curve 76 at Bragg wavelength 78. Waves presented to add port 64 at the Bragg wavelength 78 are reflected by grating 62 and coupled back to output port 67. A detailed conceptual view of the internal operation of the tunable optical coupler is shown in FIG. 8. 3 db coupler 90 accepts input wave energy at port 91, and divides this input wave energy into equal outputs at ports 94 and 95. Short period gratings 96 and 97 are exactly matched, and reflect wave energy at the Bragg wavelength to 3 db coupler 90, where reflected wave energy couples to drop port 92. Wave energy outside the Bragg wavelength continues through gratings 96 and 97, to 3 db coupler 100, where the out-of-band waves couple out of drop port 103. Waves at the Bragg wavelength input to add port 102 are reflected by gratings 96 and 97 and combine at output port 103. In summary, it can then be seen that all out-of band wave energy continues through from input port 91 to output port 102, while in-band wave energy is delivered to drop port 103, and in-band wave energy added at port 92 is delivered to output port 102.

We claim:

1. A tunable optical filter comprising an optical waveguide having an inner core surrounded by a cladding, said optical waveguide having an input port end, an output port end, and a middle tunable section; said middle tunable section further comprising a Bragg grating in proximity to and optically interacting with a variable-index material having an index of refraction which varies through application of an external control, said Bragg grating comprising a periodic modulation of the index of refraction of said optical waveguide cladding.

2. The tunable optical filter of claim 1 wherein said Bragg grating comprises an isoplanar modulation of said cladding index of refraction, said isoplanar modulation perpendicular to said optical waveguide core.

3. The tunable optical filter of claim 1 wherein said middle tunable section comprises a side polished optical waveguide having a Bragg grating applied to said polished cladding, said Bragg grating in contact with said variable-index material.

4. The tunable optical filter of claim 3 wherein said optical waveguide comprises an optical fiber.

5. A tunable optical filter comprising an optical waveguide having an inner core surrounded by a cladding, said optical waveguide having an input port end, an output port end, and a middle tunable section; said middle tunable section further comprising a Bragg grating in proximity to and optically interacting with a variable-index material having an index of refraction which varies through application of an external control, said Bragg grating comprising a periodic modulation of the index of refraction in said optical waveguide inner core, wherein said Bragg grating comprises an isoplanar modulation of said inner core index of refraction, said isoplanar modulation having an angle of between 80 degrees and 88 degrees with respect to said optical waveguide inner core, such that fundamental mode waves entering said input port interact with said angled Bragg grating and waves at the Bragg wavelength are converted from fundamental mode to second mode waves.

6. A variable output ratio optical splitter comprising a first and second optical waveguide and a variable coupling section, each of said waveguides comprising an inner core and outer cladding and each of said waveguides having an input end, an output end, and a side polished middle, said variable coupling section comprising each of said side polished waveguides placed on opposing sides of a material having a variable index of refraction.

7. The tunable optical filter of claims 3, 4, or 5 wherein said Bragg grating is a short-period grating, and said isoplanar modulation angle is chosen such that fundamental mode waves at said Bragg wavelength applied to said input port are maximally converted to second mode waves by said Bragg grating, said converted second mode waves being reflected to said input port, all other waves continuing to said output port.

8. The tunable optical filter of claims 3, 4, or 5 wherein said Bragg grating is a long-period grating, and said isoplanar modulation angle is chosen such that fundamental mode waves at said Bragg wavelength applied to said input port are maximally converted to second mode waves by said Bragg grating, said converted second mode waves continuing to said output port.

9. The tunable optical filter of claims 2, 3, 4, 5, or 6 wherein said variable index material is an electro-optic polymer.

10. A tunable optical filter comprising a first and second optical waveguide and a tuning section, each of said waveguides comprising an inner core and outer cladding, each of said waveguides also having an input end, an output end, and a polished middle section having a polished and reduced cladding, said tuning section comprising each of said polished middle sections placed on opposing sides of a material having a variable index of refraction, and at least one of said waveguides having a Bragg grating in said tuning section.

11. The tunable optical filter of claim 10 wherein said first optical waveguide comprises a single-mode optical fiber having a Bragg grating in said middle section, and said second waveguide comprises a multi-mode optical fiber.

12. The tunable optical filter of claim 10 wherein each of said first and second optical waveguides comprises a single-mode optical fiber having a side-polished middle section including a Bragg grating.

13. The tunable optical filter of claim 12 wherein said Bragg grating comprises an isoplanar modulation of said cladding on each of said optical waveguides.

14. The tunable optical filter of claim 12 wherein said Bragg grating comprises an isoplanar modulation of said inner core on each of said optical waveguides.

15. A tunable optical filter comprising an optical waveguide having an inner core surrounded by a cladding, said optical waveguide having an input port end, an output port end, and a middle tunable section; said middle tunable section further comprising a Bragg grating in proximity to and optically interacting with a variable-index material having an index of refraction which varies through application of an external control, said Bragg grating comprising a periodic modulation of the index of refraction in said optical waveguide inner core.

16. The tunable optical filter of claim 15 wherein said Bragg grating comprises an isoplanar modulation of said inner core index of refraction, said isoplanar modulation perpendicular to said optical waveguide inner core.

17. The tunable optical filter of claim 16 wherein said variable index material is an electro-optic polymer.

18. The tunable optical filter of claim 15 wherein said Bragg grating comprises an isoplanar modulation of said inner core index of refraction, said isoplanar modulation having an angle of between 80 degrees and 88 degrees with respect to said optical waveguide inner core, such that fundamental mode waves entering said input port interact with said angled Bragg grating and waves at the Bragg wavelength are converted from fundamental mode to second mode waves.

19. The tunable optical filter of claim 18 wherein said Bragg grating is a short-period grating, and said isoplanar modulation angle is chosen such that fundamental mode waves at said Bragg wavelength applied to said input port are maximally converted to second mode waves by said Bragg grating, said converted second mode waves being reflected to said input port, all other waves continuing to said output port.

20. The tunable optical filter of claim 18 wherein said Bragg grating is a long-period grating, and said isoplanar modulation angle is chosen such that fundamental mode waves at said Bragg wavelength applied to said input port are maximally converted to second mode waves by said Bragg grating, said converted second mode waves continuing to said output port.

* * * * *